US012379687B2

(12) United States Patent
Kimura

(10) Patent No.: US 12,379,687 B2
(45) Date of Patent: Aug. 5, 2025

(54) IMAGE FORMATION APPARATUS WITH COVER MEMBER AND EXPOSURE UNIT

(71) Applicant: Oki Electric Industry Co., Ltd., Tokyo (JP)

(72) Inventor: Toshiyuki Kimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/655,320

(22) Filed: May 6, 2024

(65) Prior Publication Data

US 2024/0393733 A1 Nov. 28, 2024

(30) Foreign Application Priority Data

May 22, 2023 (JP) ................................ 2023-083770

(51) Int. Cl.

*G03G 21/16* (2006.01)
*G03G 15/01* (2006.01)
*G03G 15/04* (2006.01)

(52) U.S. Cl.

CPC ....... *G03G 21/1633* (2013.01); *G03G 15/011* (2013.01); *G03G 15/0194* (2013.01);

(Continued)

(58) Field of Classification Search

CPC ............ G03G 21/1633; G03G 15/011; G03G 15/0194; G03G 15/04036; G03G 21/1647; G03G 2221/1654; G03G 2221/169; G03G 21/1666; G03G 15/04063; G03G 15/04054; G03G 2221/1687; G03G 2215/0421; G03G 2215/0407; G03G 2215/0409; G03G 2215/0412; G03G 21/1619; G03G 2221/1636; G03G 15/04072

See application file for complete search history.

(56) References Cited

U.S. PATENT DOCUMENTS

2009/0252528 A1* 10/2009 Yamaguchi ........ G03G 21/1628 399/111
2016/0018779 A1* 1/2016 Takano ............. G03G 21/1633 347/118

(Continued)

FOREIGN PATENT DOCUMENTS

JP 2019-168505 A 10/2019

*Primary Examiner* — Stephanie E Bloss
*Assistant Examiner* — Laura Roth
(74) *Attorney, Agent, or Firm* — METROLEX IP LAW GROUP, PLLC; Robert L. Scott, Esq.

(57) ABSTRACT

An image formation apparatus according to an embodiment may include: an exposure unit configured, when a cover member is opened from a closed position to an open position, to move from a first position to a second position with respect to the cover member; and a lock mechanism. When the cover member is in the open position, the exposure unit is movable between the second position and a third position in which the angle of the exposure unit relative to the cover member is different from that in the second position. The lock mechanism locks a position of the exposure unit when the exposure unit is in the third position. The lock mechanism releases the lock of the position of the exposure unit, when the cover member is moved from the open position to the closed position in the state where the exposure unit is in the third position.

18 Claims, 12 Drawing Sheets

COVER MEMBER 3 IS IN CLOSED POSITION & EXPOSURE UNIT 7 IS IN EXPOSURE POSITION

COVER MEMBER 3 IS IN OPEN POSITION & EXPOSURE UNIT 7 IS IN RETRACTED POSITION

(52) U.S. Cl.
CPC ... *G03G 15/04036* (2013.01); *G03G 21/1647* (2013.01); *G03G 21/1666* (2013.01); *G03G 15/04054* (2013.01); *G03G 2215/0407* (2013.01); *G03G 2221/1636* (2013.01); *G03G 2221/1654* (2013.01); *G03G 2221/1687* (2013.01); *G03G 2221/169* (2013.01)

(56) References Cited

U.S. PATENT DOCUMENTS

| | | | | |
|---|---|---|---|---|
| 2019/0179254 | A1* | 6/2019 | Itabashi | F21S 8/00 |
| 2020/0209801 | A1* | 7/2020 | Nakajima | G03G 21/1628 |

* cited by examiner

COVER MEMBER 3 IS IN CLOSED POSITION & EXPOSURE UNIT 7 IS IN EXPOSURE POSITION

COVER MEMBER 3 IS IN OPEN POSITION & EXPOSURE UNIT 7 IS IN RETRACTED POSITION

COVER MEMBER 3 IS IN OPEN POSITION & EXPOSURE UNIT 7 IS IN NON-RETRACTED POSITION

COVER MEMBER 3 IS IN OPEN POSITION &
EXPOSURE UNIT 7 IS IN RETRACTED POSITION

EXPOSURE UNIT 7 IS IN RETRACTED POSITION

COVER MEMBER 3 IS IN OPEN POSITION &
EXPOSURE UNIT 7 IS IN NON-RETRACTED POSITION

LOCKED STATE

LOCK RELEASE OPERATION

IMAGE FORMATION APPARATUS WITH COVER MEMBER AND EXPOSURE UNIT

CROSS REFERENCE TO RELATED APPLICATIONS

This application claims priority based on 35 USC 119 from prior Japanese Patent Application No. 2023-083770 filed on May 22, 2023, entitled "IMAGE FORMATION APPARATUS", the entire contents of which are incorporated herein by reference.

BACKGROUND

The disclosure may relate to an image formation apparatus.

In a related art, there has been known an image formation apparatus that includes an apparatus main body, a cover member that is openable and closeable with respect to the apparatus main body, and the exposure unit supported by the cover member. When the cover member is opened from a closed position to an open position, an angle of the exposure unit with respect to the cover member is changed.

Patent Document 1: Japanese Patent Application Publication No. 2019-168505

SUMMARY

However, there may be a problem in that in the state where the exposure unit is moved to the position where the angle of the exposure unit with respect to the cover member is changed, maintenance/inspection work on the exposure unit may be difficult.

An object of an embodiment of the disclosure is to provide an image formation apparatus in which maintenance and inspection on an exposure unit can be easily performed.

A first aspect of the disclosure may be an image formation apparatus that may include: a cover member supported to be openable and closable between a closed position and an open position with respect to an apparatus main body; an exposure unit configured, when the cover member is opened from the closed position to the open position, to move from a first position to a second position where an angle of the exposure unit relative to the cover member is different from that in the first position; and a lock mechanism configured to lock a position of the exposure unit. The exposure unit is configured, when the cover member is in the open position, to be movable between the second position and a third position in which the angle of the exposure unit relative to the cover member is different from that in the second position, the lock mechanism is configured, when the exposure unit is in the third position, to lock the position of the exposure unit, and the lock mechanism is configured, when the cover member is moved to the closed position from a state where the cover member is in the open position with the exposure unit being in the third position, to release the lock of the position of the exposure unit.

According to the aspect described above, maintenance and inspection on the exposure unit can be easily performed.

BRIEF DESCRIPTION OF DRAWINGS

FIGS. 2A to 2C are diagrams illustrating states of a cover member and an exposure unit of the image formation apparatus according to an embodiment, wherein FIG. 2A illustrates the cover member is a closed position and the exposure unit is in an exposure position (a first position), FIG. 2B illustrates the cover member is in an open position and the exposure unit is in a retracted position (a second position), and FIG. 2C illustrates the cover member is in the open position and the exposure unit is in a non-retracted position (a third position);

DETAILED DESCRIPTION

Figure 1:
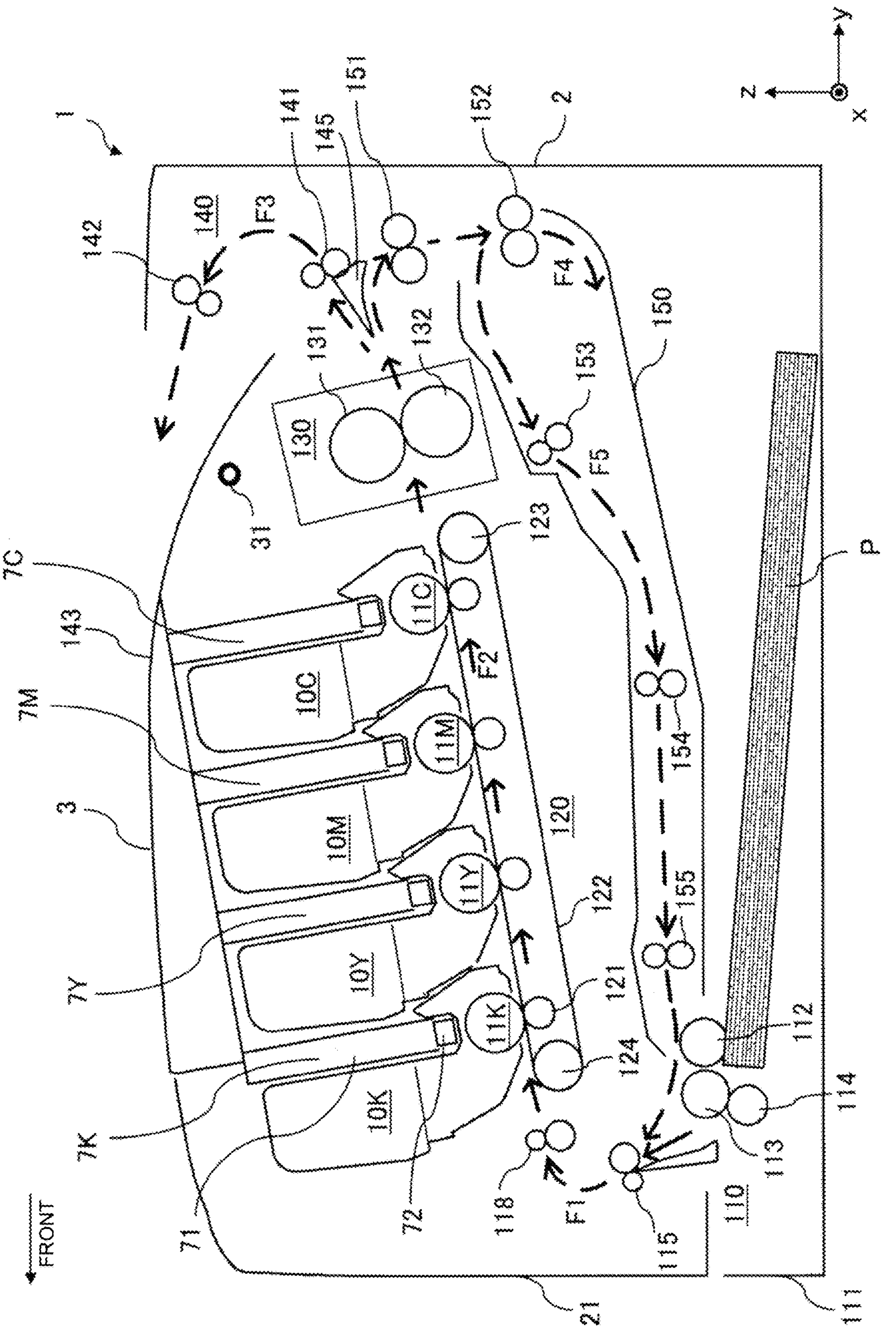
FIG. 1 is a diagram of a schematic cross sectional view of a configuration of an image formation apparatus according to an embodiment.

An image formation apparatus according to one or more embodiments are described below with reference to the drawings. The following one or more embodiments are merely examples, and various changes are possible within the scope of the disclosure. In the respective drawings referenced herein, the same constituents are designated by the same reference numerals and duplicate explanation concerning the same constituents is omitted. All of the drawings are provided to illustrate the respective examples only.

In order to make it easier to understand the relationship between the figures, the coordinate axes of the XYZ Cartesian coordinate system are illustrated in figures. A case will be described in which the xy plane is a horizontal plane and the image formation apparatus is placed on the horizontal plane. In the figures, the X direction is a widthwise direction of an image formation apparatus 1 and a widthwise direction of a print medium. The y direction is a depth direction (a front-rear direction) of the image formation apparatus, and a front surface of the image formation apparatus faces the −y direction. The Z direction is the vertical direction.

Image Formation Apparatus 1

FIG. 1 is a diagram of a schematic cross sectional view of a configuration of an image formation apparatus 1 according to an embodiment. In an embodiment, the image formation apparatus 1 is a color printer configured to form an image on a print medium P such as paper using an electrophotographic process. The image formation apparatus 1 may be a monochrome printer. The image formation apparatus 1 is configured to form the image on the print medium P based on image data received from an external apparatus such as an external computer or the like.

The image formation apparatus 1 includes a housing 2 constituting a main body of the apparatus, a cover member 3 serving as a top cover provided on a top portion of the housing 2, and a front cover 21 provided on a front surface of the housing 2. The cover member 3 is rotatably supported by the housing 2 about a first rotation shaft 31 or a first rotation axis. The front cover 21 is rotatably supported by the housing 2.

The image formation apparatus 1 includes, in the housing 2, a medium conveyance mechanism 110 configured to convey the print medium P, and image formation units 10K, 10Y, 10M, and 10C (also referred to as an "image drum units") each of which is configured to form a toner image (a developer image) on the print medium P, a transfer unit 120 (or a transfer device 120) configured to transfer the toner images to the print medium P, a fixation unit 130 (or a fixation device 130) configured to fix the toner images to the print medium P to form an image (a print image) on the print medium, and a medium discharge mechanism 140 configured to discharge the print medium P having the print image thereon.

The print medium conveyance mechanism 110 includes a feeder tray 111 in which a plurality of print media P are to be accommodated in a stacked state, a pickup roller 112 disposed to come in contact with a topmost print medium P of the plurality of print media P accommodated in the feeder tray 111, a feed roller 113 disposed adjacent to the pickup roller 112, and a retard roller 114 disposed opposite to the feed roller 113. The pickup roller 112 rotates with being in contact with the print medium P, and thereby takes out the print medium P from the feeder tray 111. The feed roller 113 feeds the print medium P that is taken out by the pickup roller 112 to a medium conveyance path F1. The retard roller 114 rotates in a direction opposite to the feed direction by the feed roller 113 to apply a resistance to the print medium P, so as to prevent an overlapped feeding of the media P. The print medium conveyance mechanism 110 also includes a pair of conveyance rollers 115 and a pair of conveyance rollers 118 that are arranged along the medium conveyance path F1 of the print medium P.

The image formation units 10K, 10Y, 10M, and 10C are arranged along the conveyance direction of the print medium P (from left to right in FIG. 1). The image formation units 10K, 10Y, 10M, and 10C form black (K), yellow (Y), magenta (M), and cyan (C) toner images, respectively. The exposure units 7K, 7Y, 7M, and 7C are arranged opposite to photosensitive drums 11K, 11Y, 11M, and 11C of the image formation units 10K, 10Y, 10M, and 10C, respectively. The exposure units 7K, 7Y, 7M, and 7C are attached to the cover member 3 so as to be rotatable with respect to the cover member 3.

The image formation units 10K, 10Y, 10M, and 10C have a common configuration except for the toners used. Therefore, the image formation units 10K, 10Y, 10M, and 10C may be referred to as the image formation units 10 below. Further, the photosensitive drums 11K, 11Y, 11M, and 11C may be referred to as the photosensitive drums 11 below. Further, the exposure units 7K, 7Y, 7M, and 7C may be referred to as the exposure units 7 below.

Each image formation unit 10 forms the toner image on the photosensitive drum 11 thereof, serving as an image carrier, using a known electrophotographic process. For example, the image formation unit 10 further includes a charging roller serving as a charging member configured to uniformly charge the surface of the photosensitive drum 11, and a development roller serving as a developer carrier configured to develop an electrostatic latent image formed on the photosensitive drum 11, a supply roller serving as a supplying member configured to supply the toner replenished from the toner cartridge to the development roller, a development blade serving as a layer regulation member configured to regulate a thickness of the toner layer on the development roller, and a cleaning member configured to remove residual toner and the like remaining on the surface of the photosensitive drum 11.

Each exposure units 7 includes an exposure head 72 and a holding member 71 serving as a holder that holds the exposure head 72. The holding member 71 may be referred to as a head holder.

The exposure head 72 includes a light emitting element array including a plurality of light emitting elements arranged in a predetermined direction, a lens array including a plurality of lens elements arranged in the predetermined direction, and a support member supporting these elements. The arrangement direction of the plurality of light emitting elements and the arrangement direction of the plurality of lens elements are parallel to an axial direction of the photosensitive drum 11 (i.e., the x direction). Each light emitting element may be a light-emitting diode (LED). Each lens element may be a rod lens, a microlens, or the like, and focuses the light from the light emitting element onto the surface of the photosensitive drum 11.

The holding member 71 is suspended and supported by the cover member 3 of the image formation apparatus 1, and holds the exposure head 72 such that the exposure head 72 is opposed to the photosensitive drum 11 in a state where the cover member 3 is in a closed position with respect to the housing of the image formation apparatus 1.

The transfer unit 120 includes an endless transfer belt 122, a drive roller 123 and an idle roller 124 around which the transfer belt 122 is wound and stretched, and four transfer rollers 121 arranged respectively opposite to the photosensitive drums 11 of the four image formation units 10 with the transfer belt 122 therebetween.

The transfer belt 122 runs with the print medium P being attracted to the surface of the transfer belt 122 by electrostatic force. The drive roller 123 rotates in the clockwise direction in FIG. 1 and causes the transfer belt 122 to run in the direction of the arrow F2 in FIG. 1. The idle roller 124 applies tension to the transfer belt 122. The transfer rollers 121 receive a transfer voltage and thus transfer the toner images from the photosensitive drums 11 to the print medium P on the transfer belt 122.

The fixation unit 130 is arranged downstream of the transfer unit 120 in the conveyance direction of the print medium P. The fixation unit 130 includes a heating roller 131 having therein a heat source and a pressure roller 132 to be pressed against the surface of the heating roller 131. The heating roller 131 and the pressure roller 132 apply heat and pressure to the toner images on the print medium P to fix the toner images on the print medium P.

The medium discharge mechanism 140 includes a pair of discharging rollers 141 and a pair of discharging rollers 142 arranged downstream of the fixation unit 130 in the conveyance direction of the print medium P. The discharging roller pairs 141 and 142 convey the print medium P along a discharge conveyance path F3 toward a medium discharge port and discharge the print medium P from the medium discharge port to the outside of the image formation apparatus 1. A stacker 143 (or a stacker section) is formed on the cover member 3 of the image formation apparatus 1. The print media P discharged by the discharging roller pairs 141 and 142 are stacked on the stacker 143.

The image formation apparatus 1 includes a re-conveying mechanism 150 configured to re-convey the print medium P on which the toner images are fixed to the medium feed conveyance path F1 for double-sided printing. The re-conveying mechanism 150 includes a switching guide 145 to switch the conveyance paths of the print medium P, and conveyance roller pairs 151 to 155. The re-conveying mechanism 150 conveys the medium P that is guided to the re-conveying mechanism 150 by the switching guide 145 to a retract path F4 by the conveyance roller pairs 151 and 152, conveys the print medium P in the opposite direction from the retract path F4 to the return conveyance path F5 by the conveyance roller pair 152, and then conveys the medium P along the return conveyance path F5 by the conveyance roller pairs 153, 154, and 155. The return conveyance path F5 joins the medium feed conveyance path F1 at a position upstream of the conveyance roller pair 118. Note that in a case where the image formation apparatus 1 does not have such a double-side print function, the reconveyance mechanism 93 may not be provided.

Note that although the arrangement direction of the four image formation units 10 is inclined with respect to the y direction in FIG. 1, the arrangement direction does not necessarily have to be inclined with respect to the y direction. The image formation unit 10 has a long shape in the axial direction of the photosensitive drum 11, that is, in the x direction.

Overview of Cover Member 3, Exposure Unit 7, and Link Unit 4

Figure 2A:
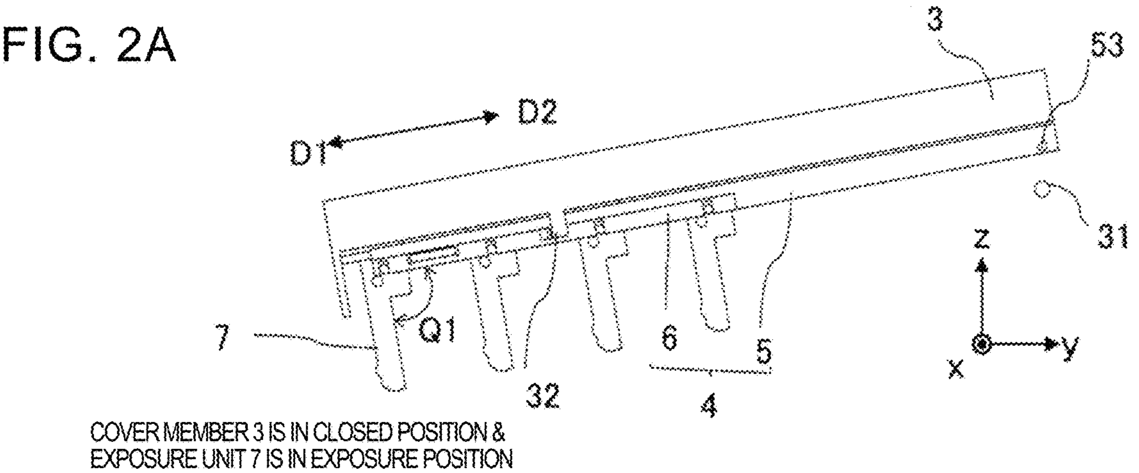
Figure 2B:
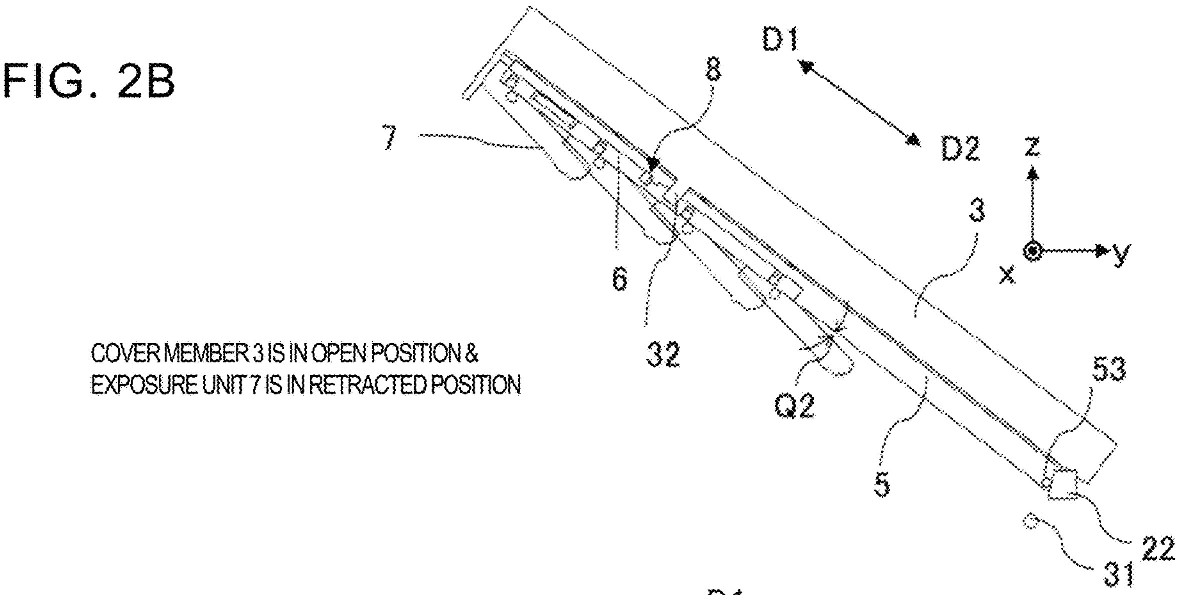
Figure 2C:
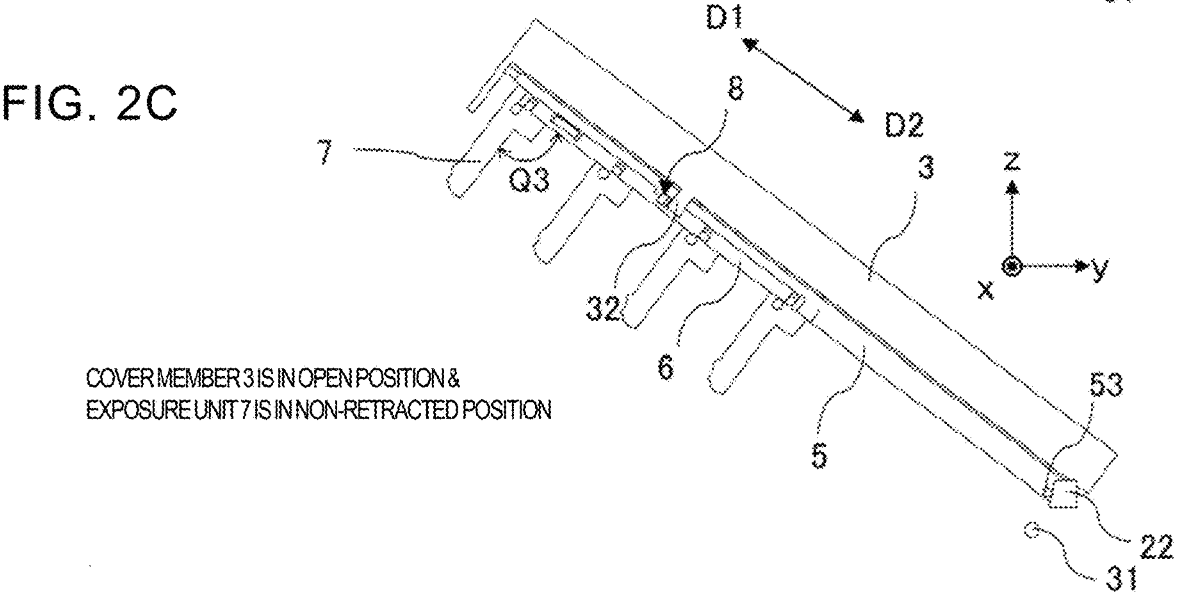

FIGS. 2A to 2C are diagrams illustrating states of the cover member 3 and the exposure unit 7 of the image formation apparatus 1. FIG. 2A illustrates the cover member 3 in the closed position and the exposure unit 7 in an exposure position (a first position). FIG. 2B illustrates the cover member 3 in an open position and the exposure unit 7 in a retracted position (a second position). FIG. 2C illustrates the cover member 3 in the open position and the exposure unit 7 in a non-retracted position (a third position). The non-retracted position of the exposure unit 7 illustrated in FIG. 2C is a maintenance/inspection position where a user can perform maintenance/inspection of the inside of the housing 2 (for example, the exposure unit 7 and its surroundings).

The image formation apparatus 1 includes the cover member 3, the exposure unit 7, and the link unit 4 configured to move the exposure unit 7. The link unit 4 includes a link member 5 held by the cover member 3 to as to be movable (for example, slidable) with respect to the cover member 3, and a slide member 6 held by the link member 5 so as to be movable (for example, slidable) with respect to the link member 5. The link unit 4 includes a lock mechanism 8 configured to lock the exposure unit 7 in the non-retracted position illustrated in FIG. 2C, and a lock release part 32 serving as a lock release mechanism configured to release the locked exposure unit 7 from the non-retracted position in order to return the position of the exposure unit 8 to the retracted position illustrated in FIG. 2B.

The link unit 4 is movably supported by the cover member 3 so as to be able to change the position of the link unit 4 with respect to the cover member 3 in at least a first direction D1 and a second direction D2 opposite to the first direction D1. The cover member 3 is provided rotatable with respect to the housing 2 about a first rotation shaft 31 (a first rotation axis) as a supporting shaft. The first direction D1 is the direction moving away from the first rotation shaft 31, and is the direction in which the cover member 3 extends.

For example, the link member 5 of the link unit 4 moves while being engaged with a guide portion(s) (for example, a guide groove(s)) provided in the cover member 3 and extending in the first direction D1. The moving direction of the link member 5 may be any direction as long as the position of the link member 5 can be changed in at least the first direction D1.

The slide member 6 is held by the link member 5 to be movable relative to the link member 5 in at least the first direction D1 and the second direction D2. The slide member 6 is configured, when the slide member 6 is moved in the first direction D1, to act on the exposure unit 7 to move the exposure unit 7 to a position in which an angle of the exposure unit 7 with respect to the cover member 3 is different from that before the slide member 6 is moved in the first direction (e.g., the exposure position). For example, the slide member 6 moves while being engaged with a guide portion(s) (for example, a guide groove(s)) provided on the link member 5 and extending in the first direction D1. The moving direction of the slide member 6 may be any direction as long as the position of the slide member 6 can be changed at least in the first direction D1.

The cover member 3 is supported by the housing 2 so as to be openable and closable with respect to the housing, that is, movable between the closed position illustrated in FIG. 2A and the open position illustrated in FIG. 2B and FIG. 2C. When it is assumed that the opening angle of the cover member 3 at the closed position is 0 degrees, the opening angle of the cover member 3 at the open position is, for example, 47 degrees. Although the opening angle of the cover member 3 at the open position is not limited to 47 degrees, the smaller the opening angle of the cover member 3 at the open position, the smaller a space (space in the vertical direction) required for installing the image formation apparatus 1 can be. However, in the case where the opening angle of the cover member 3 at the open position is small, maintenance and inspection of the inside of the housing 2 tends to become difficult.

The image formation apparatus 1 according to an embodiment is configured such that, when the cover member 3 is opened by the user, the exposure unit 7 is moved to the retracted position (FIG. 2B), and when the exposure unit 7 in the retracted position is rotated in the clockwise direction in FIG. 2B, the exposure unit 7 is moved to the non-retracted position (FIG. 2C) and is locked in the non-retracted position. Further, the image formation apparatus 1 according to an embodiment is configured such that, when the cover member 3 with the exposure unit 7 being positioned in the non-retracted position (FIG. 2C) is closed by the user, the cover member 3 is moved to the closed position illustrated in FIG. 2A.

The exposure unit 7 is configured to move from the exposure position (FIG. 2A) to the retracted position (FIG. 2B), when the cover member 3 is opened from the closed position to the open position. The retracted position (FIG. 2B) is a position where the angle Q2 of the exposure unit 7 with respect to the cover member 3 (that is, the angle Q2 of the extending direction of the exposure unit 7 in the retracted position with respect to the extending direction of the cover member 3) is different from the angle Q1 of the exposure unit 7 in the exposure position with respect to the cover member 3 (that is, the angle Q1 of the extending direction of the exposure unit 7 in the exposure position with respect to the extending direction of the cover member 3). As can be seen from FIG. 2A, when the exposure unit 7 is in the exposure position, the angle Q1 of the exposure unit 7 with respect to the direction in which the cover member 3 extends (the first direction D1) is 90 degrees or approximately 90 degrees. As can be seen from FIG. 2B, when the exposure unit 7 is in the retracted position, the angle Q2 of the exposure unit 7 with respect to the direction in which the cover member 3 extends (the first direction D1) is an angle less than 90 degrees (for example, 45 degrees or less). As can be seen from FIG. 2C, when the exposure unit 7 is in the non-retracted position, the angle Q3 of the exposure unit 7 with respect to the direction in which the cover member 3 extends (the first direction D1) is 90 degrees or approximately 90 degrees.

When the cover member 3 is in the open position, the exposure unit 7 is movable (for example, freely rotatable) between the retracted position (see FIG. 2B) and the non-retracted position (see FIG. 2C) in which the angle of the exposure unit 7 relative to the cover member 3 is different from that in the retracted position.

When the exposure unit 7 is in the non-retracted position, the lock mechanism 8 locks the position of the exposure unit 7 with respect to the cover member 3. When the cover member 3 is moved to the closed position (FIG. 2A) from the open position (FIG. 2C) with the exposure unit 7 being in the non-retracted position, the locked state in which the position of the exposure unit 7 is locked by the lock mechanism 8 is released. When the exposure unit 7 is in the non-retracted position (FIG. 2C), the angle Q3 of the exposure unit 7 with respect to the cover member 3 is approximately 90 degrees in an embodiment, but the angle Q3 is not limited to approximately 90 degrees. The angle Q3 of the exposure unit 7 in the non-retracted position with respect to the cover member 3 may be different from the angle Q1 of the exposure unit 7 in the exposure position with respect to the cover member 3 as long as the angle Q3 of the exposure unit 7 in the non-retracted position with respect to the cover member 3 is larger than the angle Q2 of the exposure unit 7 in the retracted position with respect to the cover member 3.

As described above, the image formation apparatus 1 is configured such that the position of the exposure unit 7 when the cover member 3 is in the open position is transitionable between the retracted position illustrated in FIG. 2B and the non-retracted position illustrated in FIG. 2C. In a comparative example, when the exposure unit is in the retracted position such as being illustrated in FIG. 2B, the exposure unit 7 may be in the way of accessing a consumable(s) in the housing upon replacing the consumable(s) in the housing, making maintenance and inspection work difficult. However, in an embodiment, the image formation apparatus is configured such that the angle of the exposure unit 7 with respect to the cover member 3 is changeable to the angle Q2 (FIG. 2B) and the angle Q3 (FIG. 2C), which allows the angle of the exposure unit 7 to be selected depending on the content of maintenance/inspection work. Furthermore, in an embodiment, since the exposure unit 7 can be locked at the non-retracted position, the user can easily maintain and inspect the exposure unit 7.

Details of Cover Member 3, Exposure Unit 7, and Link Unit 4

Figure 3:
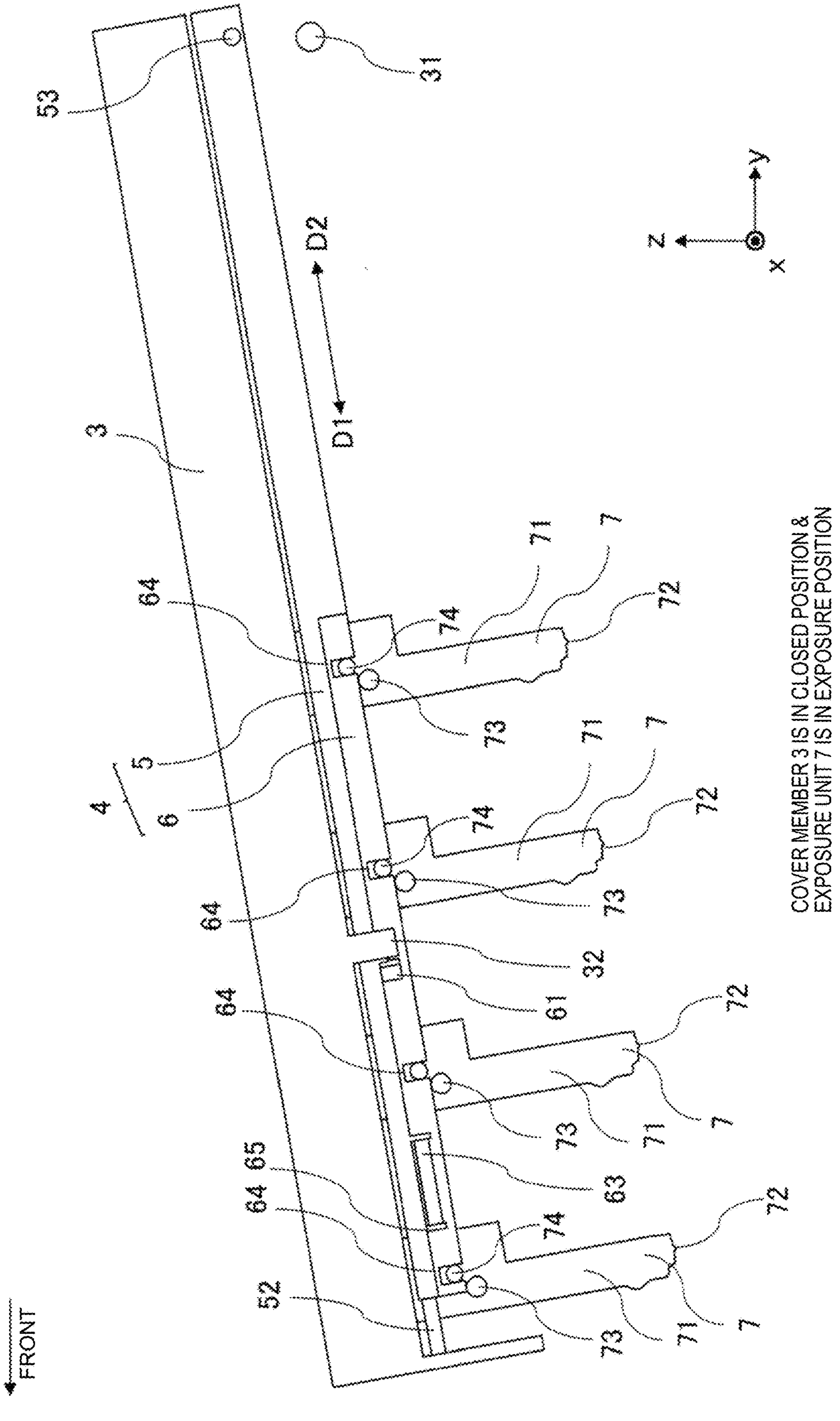
FIG. 3 is a diagram illustrating the cover member in the closed position and the exposure unit in the exposure position, and a link unit (a link member, a slide member) configured to move the exposure unit.
Figure 4:
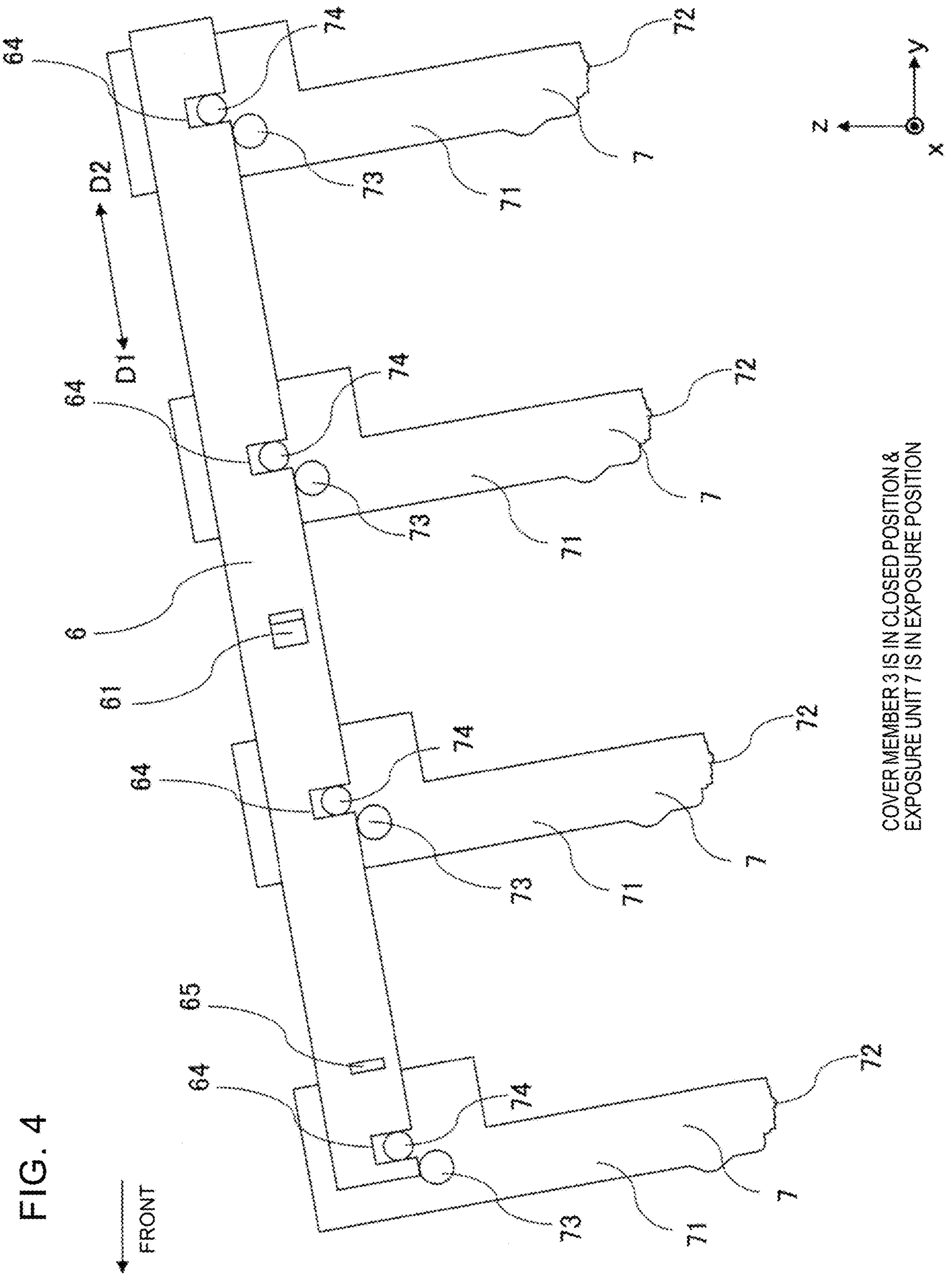
FIG. 4 is a diagram illustrating the exposure unit in the exposure position and the slide member in the state where the cover member is in the closed position.
Figure 5:
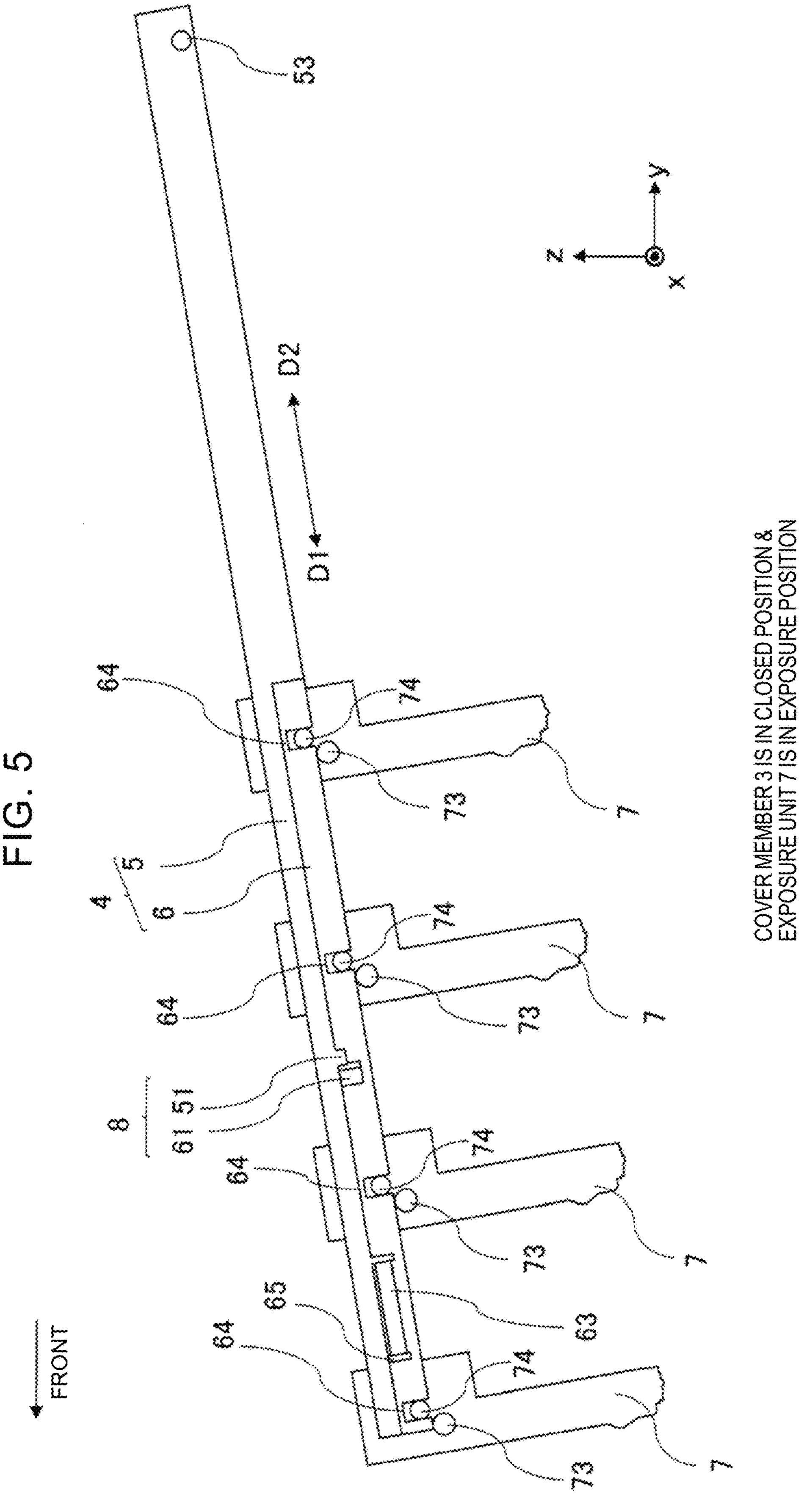
FIG. 5 is a diagram illustrating the exposure unit in the exposure position and the link unit in the state where the cover member is in the closed position.
Figure 6:
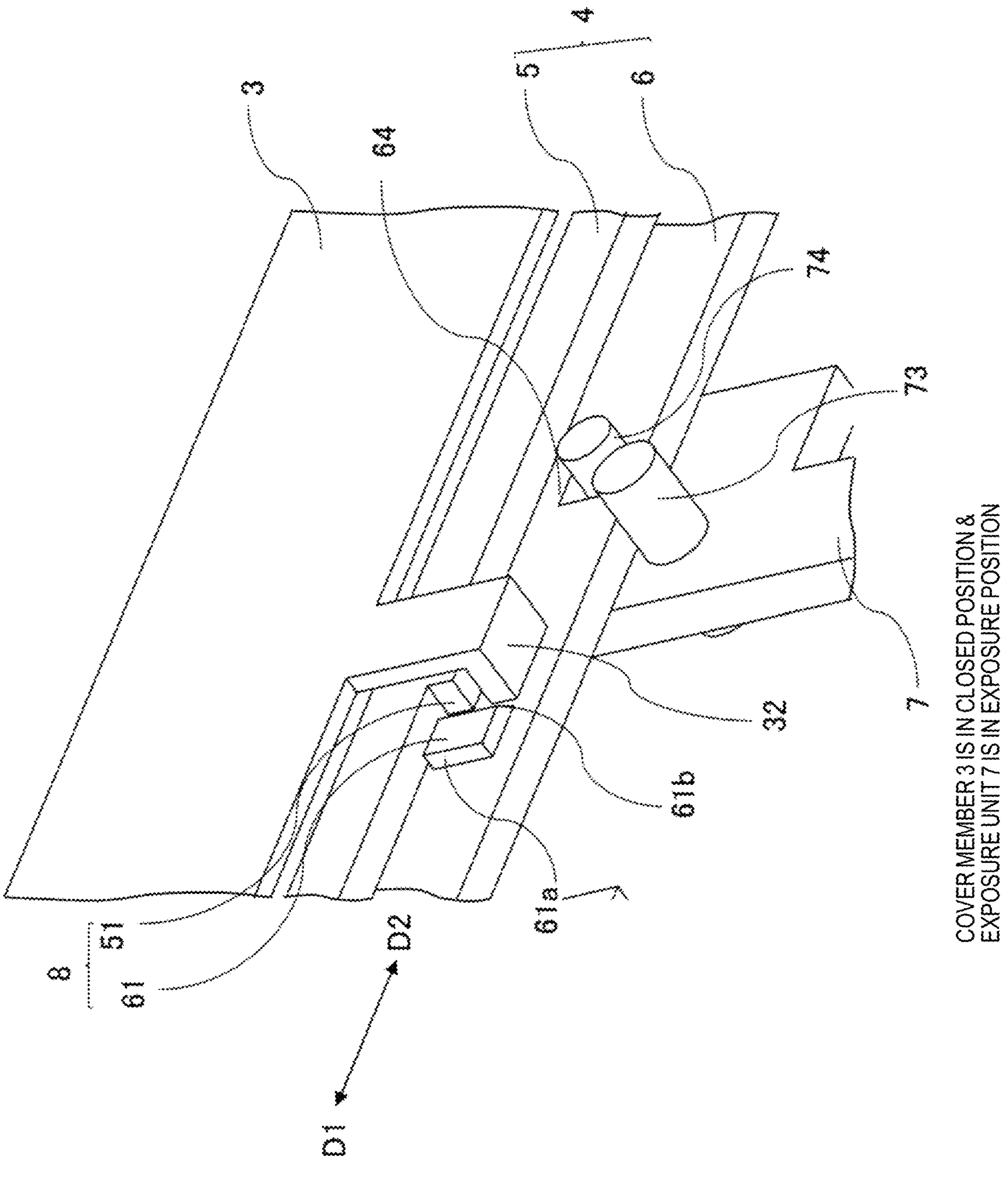
FIG. 6 is an enlarged perspective view illustrating parts of the cover member in the closed position, the exposure unit in the exposure position, and the link unit.

FIGS. 3 to 6 are diagrams illustrating the state where the cover member 3 is in the closed position and the exposure unit 7 is in the exposure position (FIG. 2A). FIG. 3 is the diagram illustrating the cover member 3, the exposure unit 7, and the link unit 4. FIG. 4 is the diagram illustrating the exposure unit 7 and the slide member 6. FIG. 5 is the diagram illustrating the exposure unit 7 and the link unit 4. FIG. 6 is the diagram of an enlarged perspective view illustrating parts of the cover member 3, the exposure unit 7, and the link unit 4.

The cover member 3 is configured to locked to the housing 2 in the closed position, by the user operating an operating part (not illustrated) such as a lock lever or the like. Further, the cover member 3 is configured, by the user operating the operating part (not illustrated), to be unlocked from the housing 2 so as to be openable with respect to the housing 2. A pair of pivot shafts 73, which constitute a second rotation shaft or a second rotation axis, are provided at both side surfaces of each of the holding members 71 of the four exposure units 7 corresponding to the four image formation units 10. The rotation shaft 73 of each of the holding members 71 of the four exposure units 7 is pivotally supported by the cover member 3 at a predetermined position. That is, each of the exposure units 7 is pivotally supported by the cover member 3 via the rotation shaft 73 thereof so as to be rotatable about the rotation shaft 73.

The image formation apparatus 1 also includes a biasing spring 63, serving as a first biasing member, formed of an elastic member such as a spring, and a biasing spring 52, serving as a second biasing member, formed of an elastic member such as a spring. The biasing spring 63 is provided at the link member 5 and applies a first biasing force to the slide member 6 in the first direction D1. In the example illustrated in FIG. 3, the biasing spring 63 is provided between the link member 5 and a projected portion of the slide member 6, and applies the first biasing force to the slide member 6 in the first direction D1. The biasing spring 52 is provided on the cover member 3 and applies a second biasing force to the link unit 4 in the second direction D2. In the example illustrated in FIG. 3, the biasing spring 52 is provided between the cover member 3 and the link member 5, and applies the second biasing force to the link member 5 in the second direction D2. The first biasing force is greater than the second biasing force.

The slide member 6 includes an affecting portion 64 or a contact portion configured, as the slide member 6 moves relative to the cover member 3, to affect (contact) an affected portion 74 or a contact portion provided at the exposure unit 7 so as to move the exposure unit 7 relative to the cover member 3. In the example illustrated in FIGS. 3 to 6, the affected portion 74 is a pin-shaped protrusion provided at the exposure unit 7, and the affecting portion 64 is a groove that is engaged with the protrusion 74. However, the structures of the affected portion 74 and the affecting portion 64 are not limited to the illustrated example. For example, the affecting portion 74 may be a groove provided in the exposure unit 7 and the affecting portion 64 may be a protrusion to be engaged with the affected portion 74.

Figure 7:
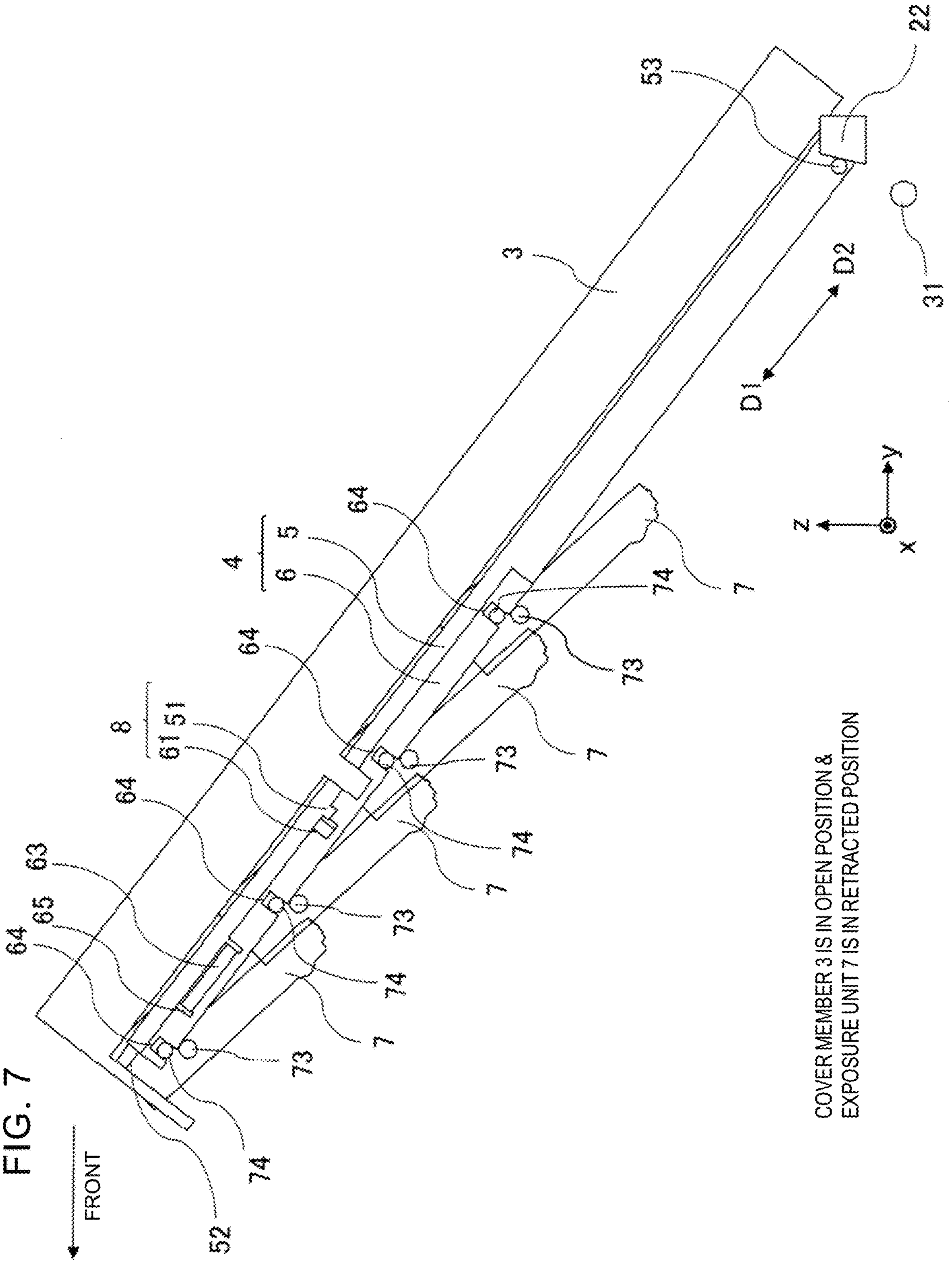
FIG. 7 is a diagram illustrating the cover member in the open position, the exposure unit in the retracted position, and the link unit.
Figure 8:
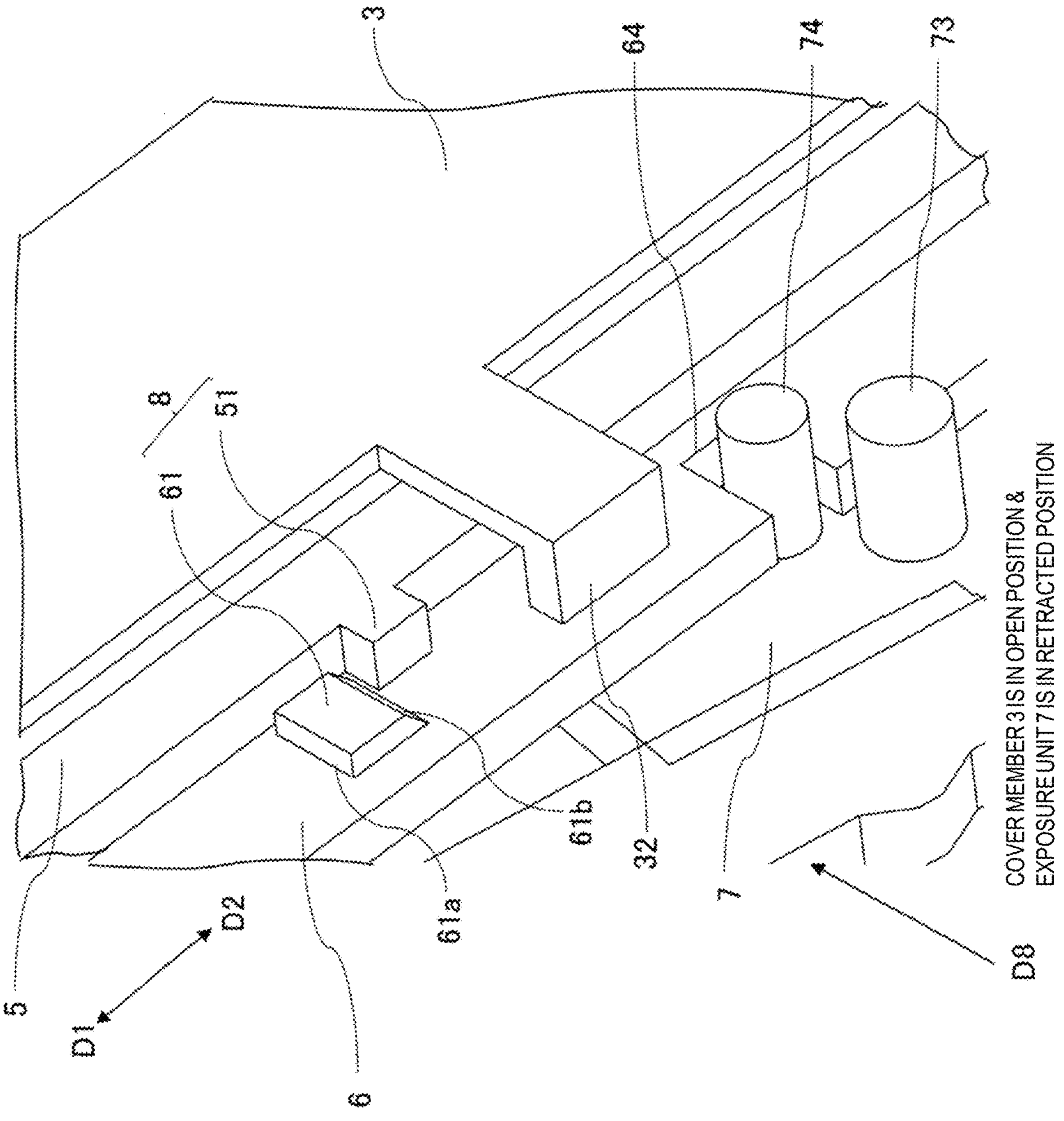
FIG. 8 is a diagram illustrating a partial enlarged perspective view of the cover member in the open position, the exposure unit in the retracted position, and the link unit.
Figure 9:
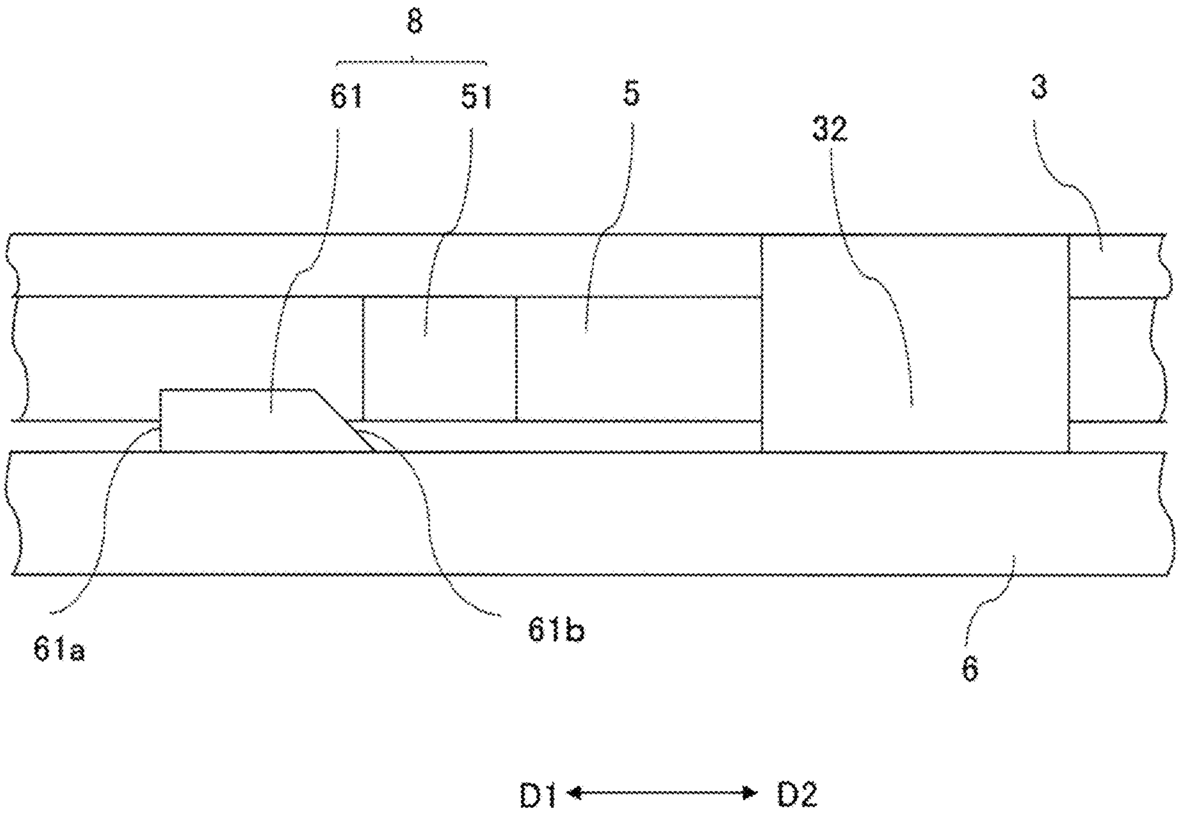
FIG. 9 is a diagram illustrating a portion viewed from the direction of the arrow D8 in FIG. 8.

FIGS. 7 to 9 are diagrams illustrating the state where the cover member 3 is in the open position and the exposure unit 7 is in the retracted position (FIG. 2B). FIG. 7 is the diagram illustrating the cover member 3, the exposure unit 7, and the link unit 4. FIG. 8 is the diagram of an enlarged perspective view illustrating parts of the cover member 3, the exposure unit 7, and the link unit 4. FIG. 9 is the diagram illustrating a portion viewed in the direction of the arrow D8 in FIG. 8.

Figure 10:
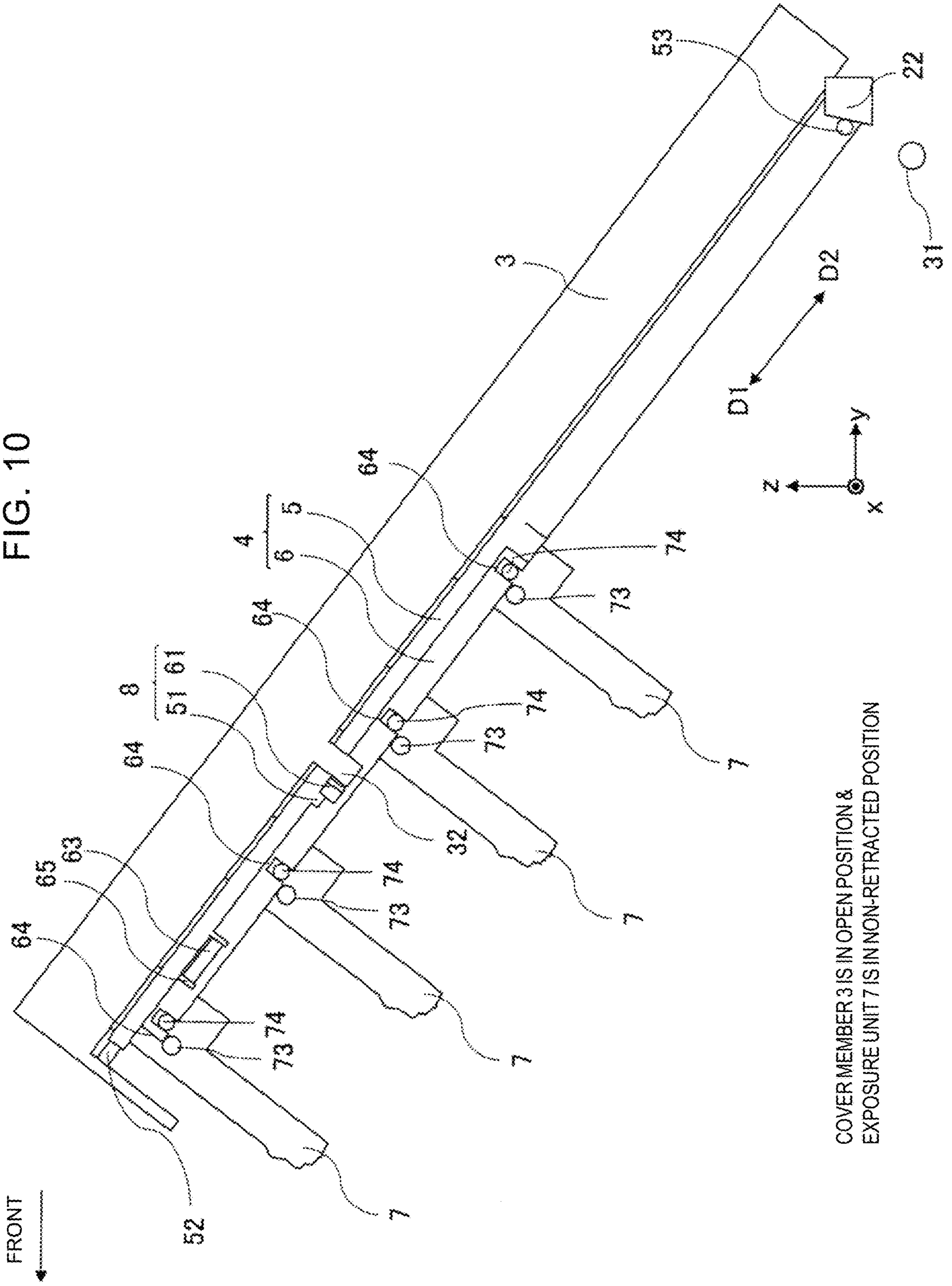
FIG. 10 is a diagram illustrating the cover member in the open position, the exposure unit in the non-retracted position, and the link unit.
Figure 11:
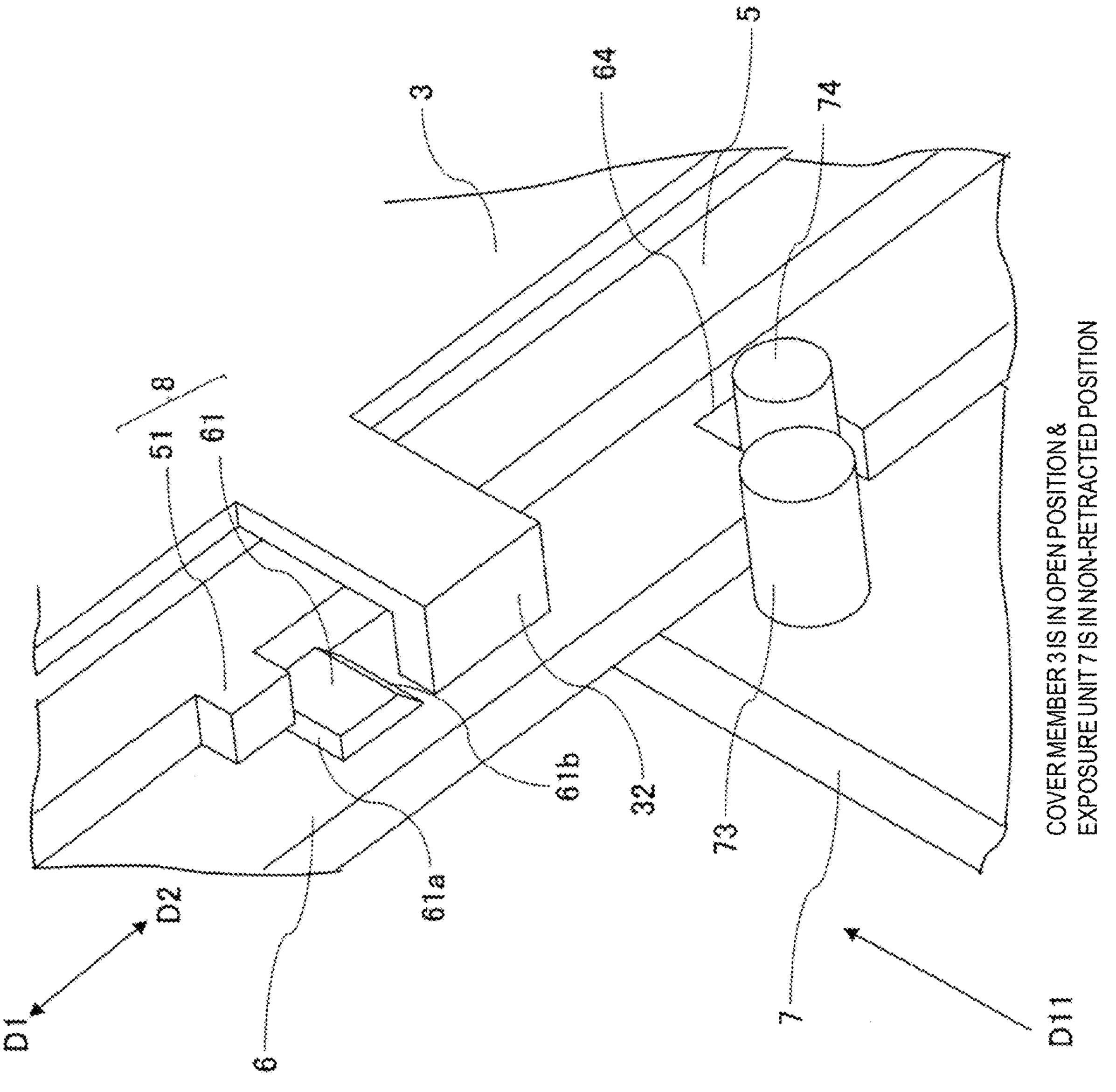
FIG. 11 is a diagram illustrating a partial enlarged perspective view of the cover member in the open position, the exposure unit in the retracted position, and the link unit.
Figure 12:
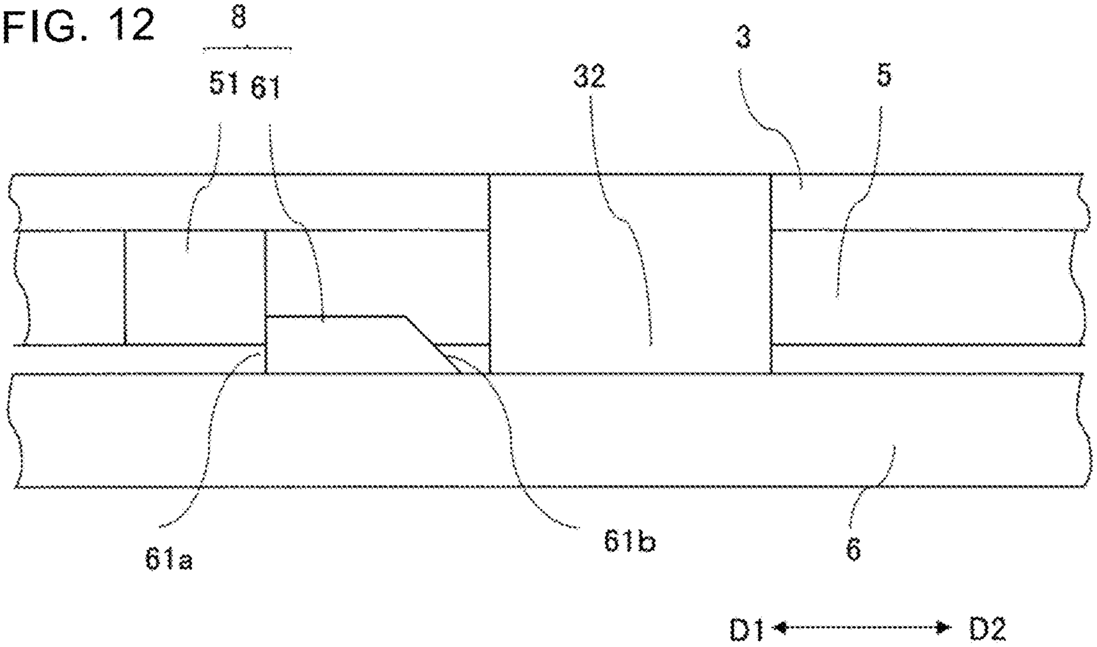
FIG. 12 is a diagram illustrating a portion viewed from the direction of the arrow D11 in FIG. 11.
Figure 13:
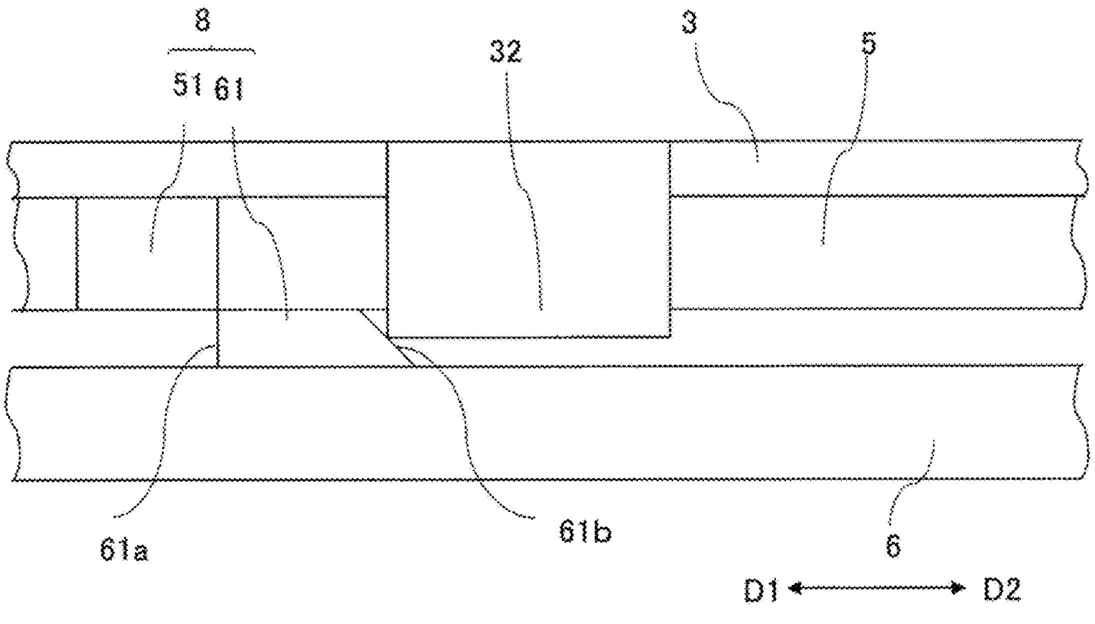
FIG. 13 is a diagram illustrating an operation of releasing an engagement of a lock mechanism (first engagement part, second engagement part).

FIGS. 10 to 12 are diagrams illustrating the state where the cover member 3 is in the open position and the exposure unit 7 is in the non-retracted position. FIG. 10 is the diagram illustrating the cover member 3, the exposure unit 7, and the link unit 4. FIG. 11 is the diagram of an enlarged perspective view illustrating parts of the cover member 3, the exposure unit 7, and the link unit 4. FIG. 12 is the diagram illustrating a portion viewed in the direction of the arrow D11 in FIG. 11. FIG. 13 is a diagram illustrating an operation (a lock release operation) of releasing the engagement of the lock mechanism 8 (a protrusion 51 as a first engagement part and a protrusion 61 as a second engagement part).

As illustrated in FIG. 8, the lock mechanism 8 includes the protrusion (the first engagement part) 51 provided at the link member 5 and the protrusion (the second engagement part) 61 provided at the slide member 6. The protrusion 61 protrudes in the x direction from the slide member 6, and includes an engagement surface 61*a* (a side surface of the protrusion) facing in the direction of the arrow D1 and an inclined surface 61*b* facing in the direction of the arrow D2. When the slide member 6 is moved in the direction of the arrow D1, the protrusion 51 of the link member 5 comes in contact with the inclined surface 61*b* of the protrusion 61 of the slide member 6, moves along the inclined surface 61*b* to the upper surface of the protrusion 61, further moves in the direction of the arrow D1, and then comes in contact with (engages with) the engagement surface 61*a* of the protrusion 61. The state in which the protrusion 51 of the link member 5 and the protrusion 61 of the slide member 6 are engaged is illustrated in FIGS. 11 and 12.

The exposure unit 7 includes the holding member 71 and the exposure head 72. The holding member 71 is supported by the cover member 3 via the rotation shaft 73 that is rotatable with respect to the cover member 3, and the exposure head 72 is provided on or held by the holding member 71 at a position away from the rotation shaft 73. When the exposure unit 7 is in the non-retracted position, the exposure head 72 is further away from the cover member 3 than when the exposure unit 7 is in the retracted position. Further, when the exposure unit 7 is in the non-retracted position, the exposure head 72 is further away from the first rotation shaft 31 than when the exposure unit 7 is in the retracted position.

The biasing force of the biasing spring 63 that biases the slide member 6 with respect to the link member 5 in the first direction D1 is greater than the biasing force of the biasing spring 52 that biases the link unit 4 with respect to the cover member 3 in the second direction D2.

The slide member 6 includes the affecting portion 64 (the contact portion) configured, as the slide member 6 moves relative to the cover member 3, to affect the affected portion 74 (the contact portion) provided at the exposure unit 7 so as to move the exposure unit 7 relative to the cover member 3.

The biasing spring 63 is further provided which biases the slide member 6 with respect to the link member 5 in the first direction D1. When the lock of the exposure unit 7 by the lock mechanism 8 is released, the biasing force of the biasing spring 63 moves the slide member 6 in the first direction D1 with respect to the link member 5 so as to move the exposure unit 7 from the non-retracted position to the retracted position.

The cover member 3 is provided with the biasing spring 52 configured to bias the link member 5 in the second direction D2 with respect to the cover member 3, and a press member 22 (or a contact part) configured, when the cover member 3 rotates from the closed position to the open position, to bias the link unit 4 so as to move the link unit 4 in the first direction D1 with respect to the cover member 3.

The link member 5 is movably supported with respect to the cover member 3, and the slide member 6 is movably supported with respect to the link member 5. As illustrated in FIGS. 3, 7, and 10, the affecting portion 64, which is the groove of the slide member 6, and the affected portion 74, which is an engagement portion (the pin-shaped protrusion) of the exposure unit 7, are engaged with each other, so that when the slide member 6 is moved in the first direction or the second direction, the exposure unit 7 receives a rotational moment about the rotation shaft 73 so as to be rotated about the rotation shaft 73. The affecting portion 64 and the affected portion 74 are not limited to the illustrated example. For example, the affecting portion 64 may be a protrusion, and the affected portion 74 may be a groove.

As illustrated in FIGS. 7 and 10, the housing 2 is provided with the press member 22 (or the contact portion 22), and the link member 5 is provided with a contact portion 53 at a position facing the press member 22 (the contact portion 22) of the housing 2. When the cover member 3 is in the open state, the contact portion 53 of the link member 5 is in contact with the press member 22 so that the link member 5 receives a pushing force from the press member 22 in the direction of the arrow D1. With this, the link member 5 is moved in the direction of the arrow D1 with respect to the cover member 3. The link member 5 is provided with the protrusion 51 (the first engagement part), and the slide member 6 is provided with the protrusion 61 (the second engagement part). As illustrated in FIG. 8, the protrusion 61 includes the engagement surface 61*a* and the inclined surface 61*b*. The cover member 3 is provided with the lock release part 32 at a position opposite to the protrusion 61 of the slide member 6.

The biasing spring 52 is provided between the cover member 3 and the link member 5 so as to bias the link member 5 toward the rear side of the apparatus (in the second direction D2) with respect to the cover member 3. The biasing spring 63 is provided between the link member 5 and the slide member 6 so as to bias the slide member 6 toward the front side of the apparatus (in the first direction D1) with respect to the link member 5.

As the cover member 3 is opened from the closed position, the contact portion 53 of the link member 5 comes into contact with the press member 22. Until the contact portion 53 of the link member 5 comes in contact with the press member 22, the link member 5 is pressed in the direction of the arrow D2 by the biasing force of the biasing spring 52, so that the link member 5 rotates together with the cover member 3 at a position defined by a limiter (not illustrated).

After the contact portion 53 of the link member 5 comes in contact with the press member 22 as the cover member 3 is opened, the press member 22 presses the link member 5 to move toward the front side of the apparatus with respect to the cover member 3 against the biasing spring 52. When the link member 5 is moved toward the front side of the apparatus (in the first direction D1) with the respect to the cover member 3, the movement of the link member 5 moves the slide member 6 toward the front side of the device (in the first direction D1) via the biasing spring 63 between the link member 5 and the slide member 6.

With this, the exposure unit 7, which is pivotably supported by the cover member 3 about the rotation shaft 73 and is engaged with the affecting portion (the groove) 64 of the slide member 6, rotates about the rotation shaft 73 in the direction toward the cover member 3 so as to move to the retracted position (see FIGS. 2B and 7). When the cover member 3 is in the open state, the exposure unit 7 is located at the retracted position thereof and thus a space is provided above the fixation unit 130 and the image formation unit 10. Accordingly, in the open state of the cover member 3, the fixation unit 130 and the image formation unit 10 can be easily attached and detached.

When any of the exposure units 7 is manually rotated from the retracted position (see FIGS. 2B and 7) to the non-retracted position (see FIGS. 2C and 10) in the state where the cover member 3 is opened with the exposure units 7 being in the retracted position (FIG. 2B), the slide member 6 moves to the rear side of the apparatus (in the second direction D2) without the link member 5 being moved while the biasing spring 63 is compressed. With this movement of the slide member 6 with respect to the link member 5 in the second direction D2, the protrusion 61 of the slide member 6 moves from the D1 side (see FIG. 9) of the protrusion 51 to the D2 side (see FIG. 12) of the protrusion 51, and then the slide member 6 and the link member 5 are engaged with each other by means of the engagement of the protrusion 61 of the slide member 6 and the protrusion 51 of the link member 5 (see FIGS. 10 and 12), which maintains the exposure unit 7 in the non-retracted position (see FIGS. 2C and 10).

As the cover member 3 is closed from the state where the exposure unit 7 is in the non-retracted position (FIGS. 2C and 10), the contact portion 53 of the link member 5 is separated away from the press member 22, and thus the link member 5 moves in the direction of arrow D2 with respect to the cover member 3 due to the biasing force of the biasing spring 52. With this, as illustrated in FIG. 13, the lock release part 32 (for example, a tip of the lock release part 32) provided at the cover member 3 comes in contact with the inclined surface 61*b* of the protrusion 61, so that the slide member 6 moves or a part of the slide member 6 is bent in a direction away from the cover member 3 and the link member 5 (for example, inward in the width direction of the image formation apparatus 1 (the downward direction in FIG. 13)), which causes the engagement between the engagement surface 61*a* of the protrusion 61 and the protrusion 51 to be released, that is, which release the lock of the exposure unit 7 from the retracted position. When the engagement between the engagement surface 61*a* of the protrusion 61 and the protrusion 51 is released, the slide member 6 moves toward the front side of the apparatus (in the first direction D1) with respect to the link member 5 due to the biasing force of the biasing spring 63. Thereafter, when the cover member 3 is returned in the closed position, the exposure unit 7 is returned to the exposure position (FIGS. 2A, 3, and 5).

Effects of Embodiment

As described above, the image formation apparatus 1 according to an embodiment includes a retraction mechanism configured, when the cover member 3 is opened by the user, to move the exposure unit 7 to the retracted position (FIG. 2B). Accordingly, cleaning or maintenance/inspection work inside the housing 2 become easy.

Further, the image formation apparatus according to an embodiment is configured such that when the cover member 3 is in the open position, the exposure unit 7 is transitionable from the retracted position (FIG. 2B) to the non-retracted position (FIG. 2C), or from the non-retracted position. (FIG. 2C) to the retracted position (FIG. 2B).

Further, the image formation apparatus according to an embodiment includes the lock mechanism 8 that is configured to lock the exposure unit 7 in the non-retracted position (FIG. 2C). Accordingly, it is possible to easily perform maintenance/inspection work on parts that are hidden by the exposure unit 7 in the retracted position.

With this configuration, the user can easily perform maintenance/inspection work on the exposure unit 7 and the surroundings of the exposure unit 7 in the housing 2. As a result, it is possible to improve the workability of maintenance/inspection work.

Further, the image formation apparatus according to an embodiment is configured such that when the cover member 3 is closed from the state where the cover is in the open position with the exposure unit 7 in the non-retracted position (FIG. 2C), the exposure unit 7 is returned to the default state of the exposure unit 7, that is, the exposure position such as being illustrated in FIG. 2A. In other words, the image formation apparatus according to an embodiment is configured such that the cover member 3 can be closed from both of the state where the exposure unit 7 is in the retracted position illustrated in FIG. 2B and the state where the exposure unit 7 is in the non-retracted position illustrated in FIG. 2C directly without going through the retracted position illustrated in FIG. 2B. Accordingly, it is possible to omit an operation to release the lock of the exposure unit in the retracted position after the maintenance/inspection work, which may improve work efficiency.

The invention includes other embodiments in addition to one or more embodiments described above without departing from the spirit of the invention. One or more embodiments described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:

a cover member supported to be openable and closable between a closed position and an open position with respect to an apparatus main body;

an exposure unit including: a holding member rotatably supported by the cover member about a rotation axis; and an exposure head provided to the holding member at a position apart from the rotation axis of the holding member, wherein the exposure unit is configured, when the cover member is opened from the closed position to the open position, to move from a first position to a second position where an angle of the exposure unit relative to the cover member is different from that in the first position; and a lock mechanism configured to lock a position of the exposure unit, wherein the exposure unit is configured, when the cover member is in the open position, to be movable between the second position and a third position in which the angle of the exposure unit relative to the cover member is different from that in the second position, wherein when the exposure unit is in the third position, the exposure head is further away from the cover member than when the exposure unit is in the second position, the lock mechanism is configured, when the exposure unit is in the third position, to lock the position of the exposure unit, and the lock mechanism is configured, when the cover member is moved to the closed position from a state where the cover member is in the open position with the exposure unit being in the third position, to release the lock of the position of the exposure unit.

2. The image formation apparatus according to claim 1, further comprising:

a link unit supported by the cover member to be movable with respect to the cover member in at least a first direction and a second direction opposite to the first direction, wherein the cover member is provided to be rotatable about a rotation axis of the cover member with respect to the apparatus main body, the first direction being a direction in which the cover member extends away from the rotation axis of the cover member, the link unit includes: a link member that is held by the cover member to be movable with respect to the cover member in at least the first direction; and a slide member that is held by the link member to be movable with respect to the link member in at least the first direction and configured, as the slide member is moved in the first direction, to affect the exposure unit to move the exposure unit to a position in which the angle of the exposure unit relative to the cover member is different from that before the slide member is moved, and the locking mechanism includes a first engagement part provided to the link member and a second engagement part provided to the sliding member, and configured to lock the exposure unit in the third position by an engagement between the first engagement part and the second engagement part.

3. The image formation apparatus according to claim 2, wherein the cover member includes a lock release part configured, when the cover member is moved to the closed position from the state where the cover member is in the open position with the exposure unit being in the third position, to come in contact with at least one of the first and second engagement parts to release the engagement between the first and second engagement parts.

4. The image formation apparatus according to claim 2, wherein when the exposure unit is in the third position, the exposure head is further away from the rotation axis of the cover member than when the exposure unit is in the second position.

5. The image formation apparatus according to claim 2, further comprising:

a first biasing member provided to the link member and applying a first biasing force in the first direction to the slide member; and a second biasing member provided to the cover member and applying a second biasing force in the second direction to the link unit, wherein the first biasing force is greater than the second biasing force.

6. The image formation apparatus according to claim 2, wherein the slide member includes an affecting portion configured, when the slide member is moved with respect to the cover member, to affect an affected portion provided in the exposure unit to move the exposure unit with respect to the cover member.

7. The image formation apparatus according to claim 6, further comprising:

a biasing member provided to the link member and applying a biasing force in the first direction to the slide member, wherein the slide member is configured, when the lock by the lock mechanism is released, to move in the first direction with respect to the link member by the biasing force of the biasing member so as to move the exposure unit from the third position toward the second position.

8. The image formation apparatus according to claim 6, further comprising:

a biasing member provided to the cover member and applying a biasing force in the second direction to the link member; and a press member that is configured, when the cover member rotates from the closed position to the open position, to press the link unit to move the link unit in the first direction with respect to the cover member.

9. The image formation apparatus according to claim 1, wherein the exposure unit is configured, when the cover member is in the open position without changing an angle of the cover member with respect to the apparatus main body, to be movable between the second position and the third position in which the angle of the exposure unit relative to the cover member is different from that in the second position.

10. An image formation apparatus comprising:

a cover member supported to be openable and closable between a closed position and an open position with respect to an apparatus main body;

an exposure unit including: a holding member rotatably supported by the cover member about a rotation axis; and an exposure head provided to the holding member at a position apart from the rotation axis of the holding member, wherein the exposure unit is configured, when the cover member is opened from the closed position to the open position, to move from a first position to a second position where an angle of the exposure unit relative to the cover member is different from that in the first position;

a lock mechanism configured to lock a position of the exposure unit; and a link unit supported by the cover member to be movable with respect to the cover member in at least a first direction and a second direction opposite to the first direction, wherein the link unit includes: a link member that is held by the cover member to be movable with respect to the cover member in at least the first direction; and a slide member that is held by the link member to be movable with respect to the link member in at least the first direction and configured, as the slide member is moved in the first direction, to affect the exposure unit to move the exposure unit to a position in which the angle of the exposure unit relative to the cover member is different from that before the slide member is moved in the first direction, the exposure unit is configured, when the cover member is in the open position, to be movable between the second position and a third position in which the angle of the exposure unit relative to the cover member is different from that in the second position, wherein when the exposure unit is in the third position, the exposure head is further away from the cover member than when the exposure unit is in the second position, the locking mechanism includes a first engagement part provided to the link member and a second engagement part provided to the sliding member, and configured, when the exposure unit is in the third position, to lock the exposure unit at the third position by an engagement between the first engagement part and the second engagement part, and the lock mechanism is configured, when the cover member is moved to the closed position from a state where the cover member is in the open position with the exposure unit being in the third position, to release the lock of the position of the exposure unit.

11. An image formation apparatus comprising:

a cover member supported to be openable and closable between a closed position and an open position with respect to an apparatus main body;

an exposure unit configured, when the cover member is opened from the closed position to the open position, to move from a first position to a second position where an angle of the exposure unit relative to the cover member is different from that in the first position; and a lock mechanism configured to lock a position of the exposure unit, wherein exposure unit is configured, when the cover member is in the open position without changing an angle of the cover member with respect to the apparatus main body, to be movable between the second position and a third position in which the angle of the exposure unit relative to the cover member is different from that in the second position, the lock mechanism is configured, when the exposure unit is in the third position, to lock the position of the exposure unit, and the lock mechanism is configured, when the cover member is moved to the closed position from a state where the cover member is in the open position with the exposure unit being in the third position, to release the lock of the position of the exposure unit.

12. The image formation apparatus according to claim 11, further comprising:

a link unit supported by the cover member to be movable with respect to the cover member in at least a first direction and a second direction opposite to the first direction, wherein the cover member is provided to be rotatable about a first rotation axis with respect to the apparatus main body, the first direction being a direction in which the cover member extends away from the first rotation axis, the link unit includes: a link member that is held by the cover member to be movable with respect to the cover member in at least the first direction; and a slide member that is held by the link member to be movable with respect to the link member in at least the first direction and configured, as the slide member is moved in the first direction, to affect the exposure unit to move the exposure unit to a position in which the angle of the exposure unit relative to the cover member is different from that before the slide member is moved, and the locking mechanism includes a first engagement part provided to the link member and a second engagement part provided to the sliding member, and configured to lock the exposure unit in the third position by an engagement between the first engagement part and the second engagement part.

13. The image formation apparatus according to claim 12, wherein the cover member includes a lock release part configured, when the cover member is moved to the closed position from the state where the cover member is in the open position with the exposure unit being in the third position, to come in contact with at least one of the first and second engagement parts to release the engagement between the first and second engagement parts.

14. The image formation apparatus according to claim 12, wherein the exposure unit includes:

a holding member rotatably supported by the cover member about a second rotation axis; and an exposure head provided to the holding member at a position apart from the second rotation axis, wherein when the exposure unit is in the third position, the exposure head is further away from the first rotation axis than when the exposure unit is in the second position.

15. The image formation apparatus according to claim 12, further comprising:

a first biasing member provided to the link member and applying a first biasing force in the first direction to the slide member; and a second biasing member provided to the cover member and applying a second biasing force in the second direction to the link unit, wherein the first biasing force is greater than the second biasing force.

16. The image formation apparatus according to claim 12, wherein the slide member includes an affecting portion configured, when the slide member is moved with respect to the cover member, to affect an affected portion provided in the exposure unit to move the exposure unit with respect to the cover member.

17. The image formation apparatus according to claim 16, further comprising:

a biasing member provided to the link member and applying a biasing force in the first direction to the slide member, wherein the slide member is configured, when the lock by the lock mechanism is released, to move in the first direction with respect to the link member by the biasing force of the biasing member so as to move the exposure unit from the third position toward the second position.

18. The image formation apparatus according to claim 16, further comprising:

a biasing member provided to the cover member and applying a biasing force in the second direction to the link member; and a press member that is configured, when the cover member rotates from the closed position to the open position, to press the link unit to move the link unit in the first direction with respect to the cover member.

* * * * *